Dec. 9, 1969   M. K. ABBOTT   3,482,485
FLUID PRESSURE SERVOMOTOR
Filed Feb. 15, 1968
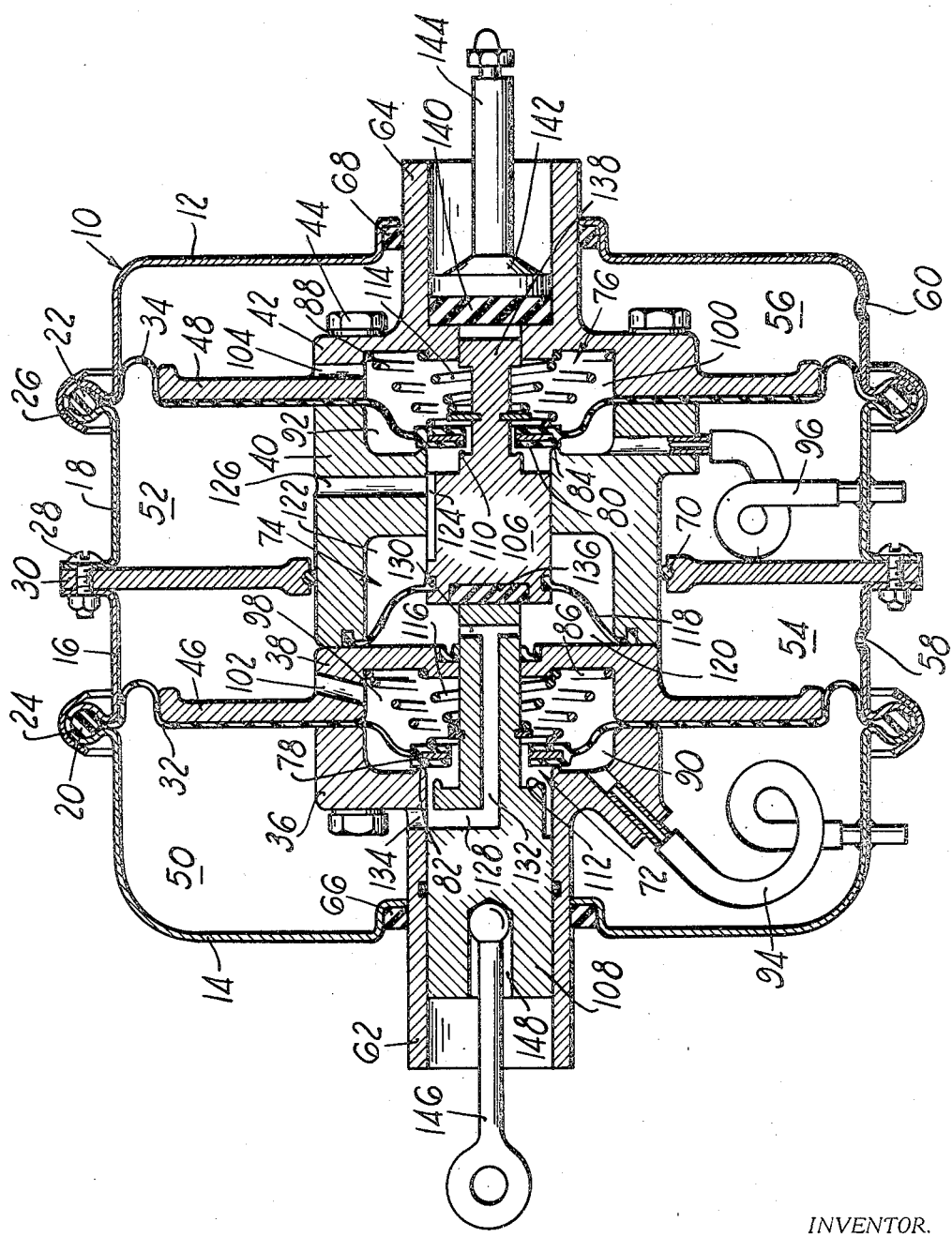
INVENTOR.
MALCOLM K. ABBOTT
BY
Richard G. Geib
ATTORNEY United States Patent Office 3,482,485
Patented Dec. 9, 1969

3,482,485
FLUID PRESSURE SERVOMOTOR
Malcolm K. Abbott, South Bend, Ind., assignor to The Bendix Corporation, a corporation of Delaware
Filed Feb. 15, 1968, Ser. No. 705,676
Int. Cl. F15b 9/10; F01b 19/00
U.S. Cl. 91—369                                      10 Claims

ABSTRACT OF THE DISCLOSURE

A fluid pressure servomotor having a housing within which a hub is sealingly related by diaphragm means which also forms a portion of valve means within the hub that has other portions controllable exteriorly of the housing to develop a pressure differential across the diaphragm means for applying a force transmitting rod connected to the internal hub structures and projecting from the housing.

Summary

Prior art fluid pressure servomotors of the type contemplated by this invention have generally utilized a vast number of parts for the internal details thereof.

It is a principal object of this invention to improve upon these structures by consolidating the parts to as few as possible.

It has also been noted in the prior art with regard to the fluid pressure servomotors generally of the type disclosed herein that single valve means have been utilized for controlling single or multiple walls within a housing without regard to fail-safe features such as are required today in braking systems for automobiles, as for example.

It is another principal object of this invention to provide a fluid pressure servomotor with dual valve elements controlling individually at least two movable walls within a housing so that upon a failure of one of the movable walls to develop sufficient pressure the other movable wall may be actuated without regard to the failed section of the servomotor.

Description

Other objects and advantages of this invention will appear from the following description of the drawing showing in cross section a fluid pressure servomotor embodying a hub structure incorporating a combination of parts and dual valve control for the several walls of the servomotor all in accordance with the principles of this invention.

More particularly, with reference to the drawing, there is shown a fluid pressure servomotor having a housing 10 comprised of a forward shell 12 and a rear shell 14 with intermediate sections 16 and 18 respectively joined to the front and rear shells 12 and 14 with diaphragm beads 20 and 22 interposed by means of band clamps 24 and 26. The assembled shells 14, 16 and 12, 18 are then joined by means of bolts 28 with a partition 30 interposed to divide the internal chamber of the housing 10 into front and rear areas.

Diaphragms 32 and 34 project inwardly in the front and rear areas of the internal chamber of housing 10 to seal the juncture of hub portions 36, 38 and 40, 42, respectively, that are connected together by means of through bolts 44. The portions 38 and 42 of the hub structure comprises radially extending walls 46 and 48, respectively, which with the diaphragms 32 and 34 comprise movable walls in the front and rear areas of the internal chamber of housing 10 as defined by the partition 30. Thus, a control chamber 50 is created between the rear housing section 14 and the movable wall, and a control chamber 52 is created between the partition 30 and the front movable wall. On the other side of the movable walls reference pressure chambers 54 and 56 are formed. These reference pressure chambers are shown to be open by means of holes 58 and 60 to the surrounding atmosphere in the embodiment shown in the drawing. However, it should be realized by those skilled in the art that appropriate inlet tubing and check valves may be affixed to the holes 58 and 60 and communicate the chambers 54 and 56 to a vacuum source, such as a vehicle's engine intake manifold, when the servomotor is desired to be employed as a power brake servomotor.

As shown the sections 36 and 42 of the composite hub structure are provided with bosses, extending rearwardly and forwardly, respectively, through the rear shell 14 and front shell 12, as at 62 and 64. Both the rear shell and the front shell are provided with seals 66 and 68 to maintain the integrity of the internal chamber of the housing 10 even though the bosses 62 and 64 project through these shells. Thus, the hub structure is supported at each end as well as intermediately by the inner seal 70 of the partition 30 so that it will not be cocked within the housing 10 during its operation.

As seen, the hub structure comprised of the portions 36, 40 and 42 that are joined by the bolts 44 are formed so as to have internal chambers 72, 74 and 76. The inner portions of the diaphragms 32 and 34 project interiorly of the chambers 72 and 76 and terminate in reinforced bead elements 78 and 80. The reinforced beads 78 and 80 are biased against valve seat 82 and 84 by valve return springs 86 and 88, respectively. In such position chambers 72 and 76 are divided into portions 90 and 92 to which a power source, such as compresesd air, is directed by means of tubular conduits 94 and 96 connected through the housing shells 14 and 18 to a compressed air source, for example with regard to the embodiment shown. If vacuum power is desired, it is to be understood that atmospheric air would be provided to chamber portions 90 and 92. The other portions 98 and 100 are opened by passages 102 and 104, respectively, to chamber 54 and 56.

Prior to the assembly of the elements 36, 38, 40 and 42 of the hub structure, as by the bolts 44, valve plungers are arranged within the hub structure such as floating valve plunger 106 and a manually controllable valve plunger 108, each of which are provided with an annular valve seat 110 and 112, respectively. The valve seats 110 and 112 when assembled are concentric with the valve seats 84 and 82 of the hub strutcure and normally spaced therebehind due to valve return springs 114 and 116 between the element 42 and the plunger 106 and between the element 38 and the plunger 108. The valve return springs 114 and 116 are united with the plungers 106 and 108 by means of snap rings and the like.

The valve plunger 106 is provided with a diaphragm 118 having its inner beads snap fitted to the valve plunger 106 and its peripheral bead clamped between the juncture of the hub elements 38 and 40. This creates variable volume chambers 120 and 122 from the intermediate chamber 74. Valve plunger 106 has grooves 124 about its periphery to communicate the chamber 122 to control passage 126 of the element 40 which exits into chamber 52 from the chamber 76 behind the valve seat 84 formed on the element 40 of the hub structure. Valve plunger 108 is provided with a radial passage 128 at one end thereof and a radial passage 130 at the other end thereof which are communicated by an axial passage 132 so that chamber 120 is communicated to control passage 134 in the element 36 via the chamber 72 thence into control chamber 50 of the servomotor. Valve plunger 108 is abuttingly connected via a rubber disc 136 to the floating valve plunger 106. The valve plunger 106 is provided with a reaction head 138 slidably supported in a hole in the element 42 of the hub structure to be spaced from a rubber disc 140 between the hub structure and the head 142 of force transmitting rod 144 which may be connected to a master cylinder, as will be familiar to those skilled in the art to which the invention relates.

Completing the construction a push rod 146 is press fitted into a hole 148 in the end of valve plunger 108, which push rod is operatively connected to a pedal, such as a vehicle's brake pedal, as will also be familiar to those skilled in the art to which this invention relates.

Operation

In operation the operator of the servomotor will depress the pedal (not shown) to move the push rod 146 inwardly causing the translation of the valve plunger 108 against the action of the valve return spring 116. Upon sufficient movement of the valve plunger 108 its valve seat 112 will lap onto the reinforced bead 78 to close communication of the chamber 98 through the central hole in the diaphragm to the control passage 134 and thus to the control chamber 50.

Depending upon the softness of the rubber disc 136 the floating valve plunger 106 will also be translated during this time to lap its seat 110 onto the reinforced bead 80 of the diaphragm 34 to close the communication of chamber 76 via passage 126 to the control chamber 52 for the forward movable wall.

Further effort upon the brake pedal will remove the reinforced bead 78 forming the valve poppet from the seat 82 of the element 36 of the hub structure to permit the introduction of compressed air from chamber 90 to the passage 134 and into the control chamber 50. At the same time this compressed air will travel via passage 128, 132 and 130 to chamber 120 to create a pressure differential across diaphragm 118. Therefore, as the hub structure is being moved because of the pressure differential across the diaphragm 32 and wall 46 in the rear chamber, as shown, a pressure differential is created across diaphragm 118 sufficient to operate the floating plunger 106 so that the reinforced bead 80 forming the forward valve poppet is removed from seat 84 whereby compressed air may enter control passage 126 and thus control chamber 52 to increase the work output of the servomotor via the force transmitting rod 144.

As the force transmitting rod 144 encounters resistance, the disc 140 is extruded onto the reaction head 138 of the floating valve plunger 106. At this time the rubber slug 136 will be sufficiently compressed so that there is a direct link between the floating plunger 106 and the operator-operated valve plunger 108 whereby the operator will have feel transmitted of the servomotor operation via the push rod 146 to the pedal (not shown).

As may be readily surmised by those skilled in the art to which this invention relates, upon a failure in the air pressure source of either conduits 94 or 96 there will be no effect whatsoever upon the operation of the other movable wall comprised of diaphragm 34, wall 48 or diaphragm 32, wall 46.

Having fully described an operative construction of my invention it is now desired to set forth the intended protection sought by these Letters Patent in the appended claims.

I claim:
1. In a fluid pressure servomotor having movable wall means including a hollow hub structure sealingly related to a housing by a diaphragm means, which hub structure includes a boss slidably mounting a force transmission means with a reaction device between the force transmission means and the hub structure to transmit some of the reaction to the hub structure, and power source connections for said hub structure, a valve means within said hub structure adapted to receive the reaction forces from said device not transmitted to said structure and to be operated by means exterior of said housing, said valve means being characterized by:

a reinforced annular bead for said diaphragm means projecting interiorly of said hollow hub structure between said power source connections leading into said hollow hub structure;

spring means biasing said bead onto seat means integral with said hub structure to form first and second chambers in said structure;

valve plunger means operatively connected to said means exterior of said housing for operating the valve means, which valve plunger means is slidably carried by said hub structure and which is formed with a valve seat spaced inwardly of and facing in the same direction as said seat means of said hollow hub structure; and spring means operatively connected to said valve plunger means to maintain a normal position for said valve seat such that said bead is resiliently seated so that areas on each side of the movable wall means is suspended in a pressure source connected to said second chamber whereby upon moving said valve plunger said second chamber is closed from one of these areas and further movement opens said first chamber to said one of these areas to create a pressure differential for operating said movable wall means to project said force transmitting rod.

2. The structure of claim 1 wherein said hub structure is comprised of multiple sections joined by means such that said diaphragm seals their assembly.

3. The structure of claim 1 wherein said housing has a partition with a movable wall means and a valve means on each side of the partition, said valve means being operatively connected to work in unison and individually control the respective movable wall on their side of said partition.

4. The structure of claim 2 wherein said housing has a partition with a movable wall means and a valve means on each side of the partition, said valve means being operatively connected to work in unison and individually control the respective movable wall on their side of said partition.

5. The structure of claim 4 and further characterized in that the valve plunger means of the valve means on each side of the partition is a two part assembly with one part thereof having means to allow for tolerances of construction such that said beads on each side of said partition are actuated simultaneously.

6. The structure of claim 5 wherein said means to allow for tolerances comprises a diaphragm within said hollow hub structure connected to one of the two parts of the valve plunger means to create a first variable volume chamber and a second variable volume chamber in said hub structure which via passage means is connected to a control chamber of one movable wall on one side of the diaphragm and a control chamber of the other movable wall on the other side of said diaphragm.

7. The structure of claim 6 wherein said passage means includes a passage in each part of the valve plunger means leading from behind one valve seat of the hub structure to the first variable volume chamber and from behind another valve seat of the hub structure to the second variable volume chamber such that said one of the two parts of the valve plunger means is lapped when control chamber pressures are substantially equal for said movable wall means on respective sides of said partition.

8. A tandem servomotor having dual valve means comprising:

a housing having a partition therewithin;

a hub structure slidably supported by said housing and said partition, said hub structure having front and rear valve chambers therewithin on each side of said partition and an intermediate chamber which opens into both valve chambers, said hub structure being connected to said housing by front and rear wall means to provide a first control chamber and a first reference pressure chamber on one side of said partition and a second control chamber and a second reference pressure chamber on the other side of said partition;

valve poppet means in each of said chambers biased to normally permit suspension of said wall means in a pressure from the reference pressure chambers and closing communication of a control pressure to the control chambers;

a floating valve plunger in said hub structure connected therewith by a movable wall in said intermediate chamber and sealingly supported to prevent communication of the front valve chamber with the intermediate chamber, said floating valve plunger being operatively arranged to actuate the valve poppet means in the front valve chamber to control said front wall means by a pressure differential across said movable wall in said intermediate chamber and by manual movement of said valve plunger;

an operator-operated valve plunger slidably supported by said hub structure to seal said rear valve chamber and operatively connected to said floating valve plunger to control manual movement thereof, said operator-operated valve plunger being operatively arranged to actuate the valve poppet means in said rear valve chamber to control said rear wall means, said operator-operated valve plunger having passage means for communicating said first control chamber to the rear of said intermediate chamber behind the movable wall of said floating valve plunger whose forward face is communicated with said first pressure chamber; and force transmitting means including a reaction device operatively connected to said hub structure and said floating valve plunger to be manually and power projected by actuation of said operator-operated valve plunger.

9. A tandem servomotor according to claim 8 wherein said floating valve plunger has passage means communicating said second control chamber to the front of said movable wall.

10. A tandem servomotor according to claim 9 wherein said floating valve plunger has a seat area on said valve poppet means associated therewith that is sized so that said movable wall is rendered ineffective as the pressures in the first and second control chambers equalize.

References Cited
UNITED STATES PATENTS

| | | | |
|---|---|---|---|
| 3,103,855 | 9/1963 | Hager et al. | 92—48 |
| 3,312,147 | 4/1967 | Reichard. | |
| 3,387,455 | 6/1968 | Eggstein. | |

PAUL E. MASLOUSKY, Primary Examiner

U.S. Cl. X.R.

91—372, 376, 413; 92—48